No. 728,437. PATENTED MAY 19, 1903.
W. M. BARNES.
STARCHING MACHINE.
APPLICATION FILED JAN. 16, 1902.
NO MODEL. 2 SHEETS—SHEET 1.

Witnesses:
M. M. Hamilton
G. D. Hutton

Inventor:
William M. Barnes
by Harding & Harden
attys

No. 728,437. PATENTED MAY 19, 1903.
W. M. BARNES.
STARCHING MACHINE.
APPLICATION FILED JAN. 16, 1902.
NO MODEL. 2 SHEETS—SHEET 2.

Witnesses:
M. M. Hamilton
G. Irwin Hutton

Inventor:
William M. Barnes

No. 728,437.

Patented May 19, 1903.

UNITED STATES PATENT OFFICE.

WILLIAM M. BARNES, OF PHILADELPHIA, PENNSYLVANIA.

STARCHING-MACHINE.

SPECIFICATION forming part of Letters Patent No. 728,437, dated May 19, 1903.

Application filed January 16, 1902. Serial No. 89,995. (No model.)

*To all whom it may concern:*

Be it known that I, WILLIAM M. BARNES, a citizen of the United States, residing at Philadelphia, county of Philadelphia, and State of Pennsylvania, have invented a new and useful Improvement in Starching-Machines, of which the following is a full, clear, and exact description, reference being had to the accompanying drawings, which form a part of this specification.

My invention has for its object in starching-machines to provide an arrangement which will enable the starch-roller to revolve at all times in the starch-receptacle and when revolving in one direction to carry starch to the garment passed between the rolls and when revolving in the other direction not to carry such starch to the garment, so that the garment passing between the rolls in one direction will have starch applied to the garment, while in the other direction will have the surplus of the previously-applied starch wiped off.

My invention also consists in an arrangement for adjusting the position of the starching-rolls with reference to each other.

Speaking generally, I accomplish the first object by providing an idle roller in contact with one side of the starch-delivery roll slightly above the level of the starch and below the other starching-roller, so that in the revolution of the starch-delivery roller in one direction the starch carried by it will not be affected by the idle roller; but in the revolution of the starch-delivery roller in the opposite direction the starch carried up by it will be removed before it reaches the other starching-roller.

I will first describe the embodiment of my invention illustrated in the accompanying drawings and then point out the invention in the claims.

Figure 1:
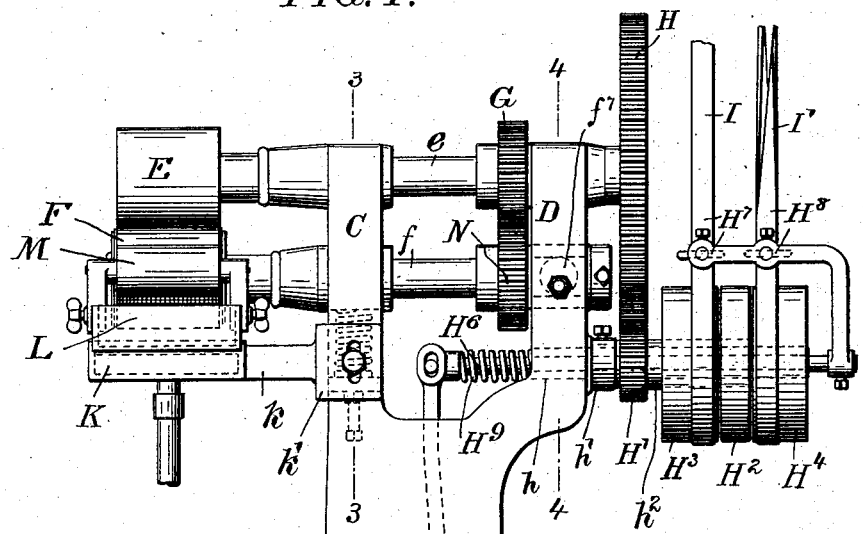
Figure 1A:
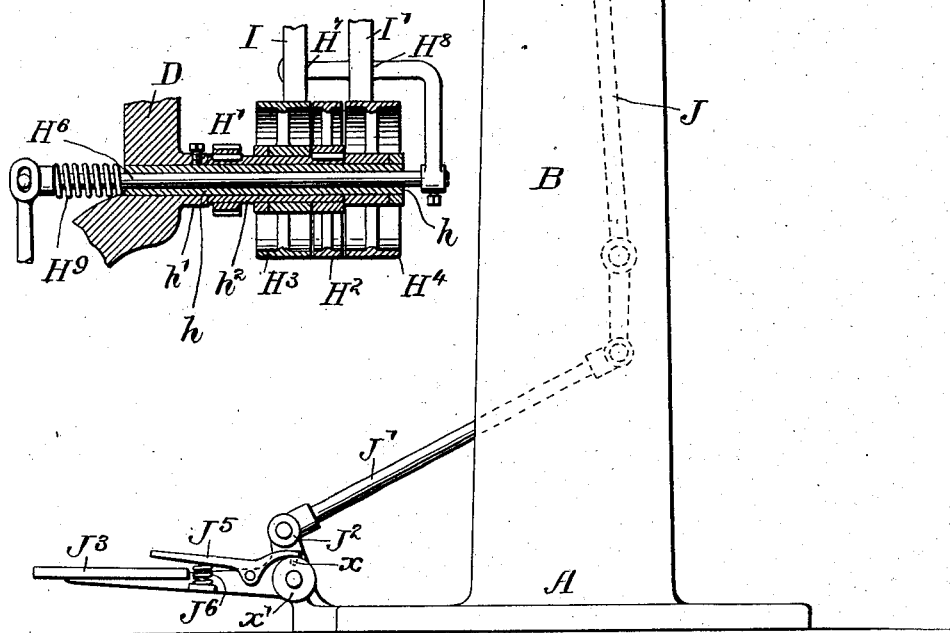
Figure 2:
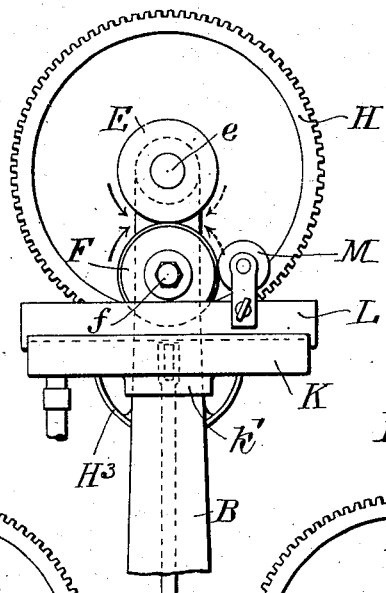
Figure 3:
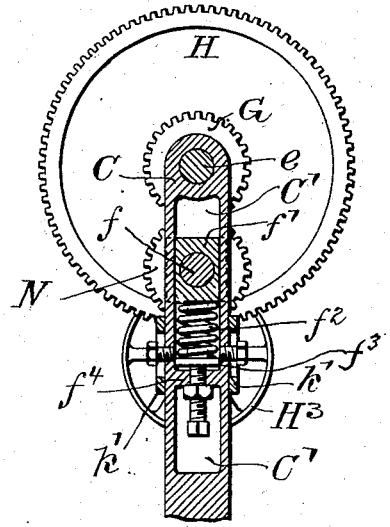
Figure 4:
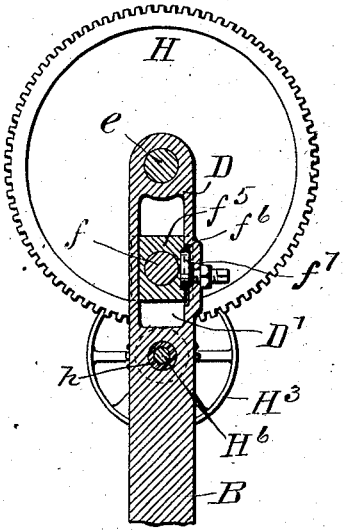
Figure 5:
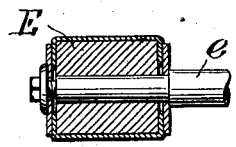

In the drawings, Figure 1 is a side elevation of my improved starching-machine. Fig. 1$^a$ is a sectional view of a portion of Fig. 1. Fig. 2 is an end view of the upper part of said machine. Fig. 3 is a section on the line 3 3, Fig. 1. Fig. 4 is a section on the line 4 4, Fig. 1. Fig. 5 is a detail section on one of the rolls.

A is the base of the machine, having the upright B and the bifurcated projecting ends C D.

E is the upper starching-roller; F, the lower starching-roller. The shaft $e$ of roller E is supported in bearings in the projecting ends C and D and has revolving with it the gears G and H. The gear H meshes with the gear H', secured to the sleeve $h^2$. This sleeve surrounds and revolves upon the projecting arm $h$, which latter is secured to the projection D. This projection D has the boss or projection $h'$ adjacent to the gear-wheel H', so that the position of the gear-wheel is maintained, and also a long support formed for the arm $h$. Secured upon this sleeve $h^2$ is also a fast pulley $H^2$. The loose pulley $H^3$ is also upon this sleeve $h^2$. The loose pulley $H^4$ is upon the arm $h$. A straight belt I coöperates with pulleys $H^2$ and $H^3$, and the cross-belt I' with the pulleys $H^2$ and $H^4$.

$H^6$ is a shifting rod which extends through the length of the arm $h$. This shifting rod controls the belt-shifters $H^7$ and $H^8$.

$H^9$ is a spring tending to hold the rod $H^6$ and the belt-shifters $H^7$ and $H^8$ in such a position that the belt I' is upon the fast pulley $H^2$.

Connected to the rod $H^6$ is a lever J, connected by a link J' to a crank $J^2$, operated by foot-treadle $J^3$. A pawl $J^5$, pivoted to the foot-treadle $J^3$ and having a pin $x$ adapted to enter an orifice in the stationary bearing $x'$, to which the treadle $J^3$ is pivoted, normally holds the parts in the position shown in Fig. 1. The bearing $x'$, supporting the pivot of the treadle, is rigidly connected to or forms part of the base of the machine.

The shaft $f$ of the lower starching-roller F is supported in the following manner: The projecting ends C and D are slotted to form frames or guides C' D'. (See Figs. 3 and 4.) Within the frame C' is the bearing $f'$ for the shaft $f$. This bearing $f'$ rests upon the spiral spring $f^2$, which rests upon the follower $f^3$. A screw passes through the bottom wall $f^4$. By this construction that end of the shaft $f$ is spring-supported and vertically adjustable. The guide D' receives a bearing $f^5$ for the other end of shaft $f$. This bearing has a cutaway portion $f^6$, in which an eccentric $f^7$ rests, said eccentric being operated by a squared head projecting through the wall of the frame or guide D'. By this arrangement the shaft $f$, and with it the roller F, may be adjusted with reference to the roller E. Revolving with the shaft $f$ is the gear N, meshing with the gear G.

K is the table, which is supported by means of a projection $k$, having the bifurcated end $k'$ secured to the projection C. Upon this table is the starch-receptacle L, within which the roller F partially revolves. Secured to the starch-receptacle and extending lengthwise of the rolls E and F on one side thereof and slightly above the starch-receptacle and below the point of contact of rolls E and F is the starch-removing roller M, touching the roller F.

The operation is as follows: When the pawl $J^5$ is released, the cross-belt is shifted to the tight pulley and the rollers E and F revolve in the direction of the full arrows, Fig. 2. Under these conditions the starch carried up by the roller F is carried against roller E and any garment passed between them is covered with starch. When the treadle $J^3$ is pushed lower than the position shown in Fig. 1, the straight belt is brought against its corresponding tight pulley and the rollers E and F revolve in the direction shown by dotted arrows, Fig. 2. In this condition any starch lifted by the roller F is forced off by roller M before it reaches roller E, and thus a garment or garments previously starched may be passed through and the previously-applied surplus starch wiped off.

Having now fully described my invention, what I claim, and desire to protect by Letters Patent, is—

1. In a starching-machine, in combination with a pair of starching-rollers, between which the garment to be starched is adapted to pass, of a starch-receptacle in which one of said rollers partially revolves and a starch-removing roller on one side of and contacting with said last-mentioned roller, said starch-removing roller being supported above the starch in said receptacle and below the point of contact of the starching-rollers, and means to revolve said starching-rollers in two directions.

2. In a starching-machine, in combination with a starch-receptacle, of a pair of starching-rollers, means to revolve said pair of rollers in two directions, one of said starching-rollers partially revolving in the starch, and a starch-removing roller contacting with one side of the last-mentioned starching-roller and supported above the starch.

In testimony of which invention I have hereunto set my hand at Philadelphia on this 10th day of January, 1902.

WILLIAM M. BARNES.

Witnesses:
M. F. ELLIS,
M. M. HAMILTON.